US011381892B1

(12) United States Patent
Scales et al.

(10) Patent No.: US 11,381,892 B1
(45) Date of Patent: Jul. 5, 2022

(54) ENCLOSURES WITH FLEXIBLE MAGNETIC CLOSURES AND CLASPS

(71) Applicant: Apple Inc., Cupertino, CA (US)

(72) Inventors: Timothy W. Scales, San Francisco, CA (US); Kodiak D. Burke, San Jose, CA (US); Linda D. Benavente-Notaro, Sherman Oaks, CA (US); Nicholas R. Trincia, San Francisco, CA (US); Benjamin A. Stevenson, Oakland, CA (US); Clayton McCoy, San Francisco, CA (US); Donald L. Olmstead, Aptos, CA (US); Hao Zhu, San Jose, CA (US); William H. Chui, Santa Clara, CA (US); Jack Pickup, Shenzhen (CN)

(73) Assignee: Apple Inc., Cupertino, CA (US)

( * ) Notice: Subject to any disclaimer, the term of this patent is extended or adjusted under 35 U.S.C. 154(b) by 585 days.

(21) Appl. No.: 16/017,835

(22) Filed: Jun. 25, 2018

Related U.S. Application Data

(60) Provisional application No. 62/526,159, filed on Jun. 28, 2017.

(51) Int. Cl.
*H04R 1/02* (2006.01)
*G06F 1/18* (2006.01)

(52) U.S. Cl.
CPC ............... *H04R 1/02* (2013.01); *G06F 1/181* (2013.01); *H04R 2201/029* (2013.01)

(58) Field of Classification Search
CPC ..... H04R 1/02; H04R 2201/029; G06F 1/181; G06F 1/1613; H05K 5/00; Y10T 24/32
See application file for complete search history.

(56) References Cited

U.S. PATENT DOCUMENTS

| | | | | | |
|---|---|---|---|---|---|
| 2,461,201 | A | * | 2/1949 | Ellis | A41F 1/002 2/311 |
| 2,627,097 | A | * | 2/1953 | Ellis | A44B 19/16 24/303 |
| 3,008,209 | A | | 11/1961 | Kurt | |
| 3,417,406 | A | * | 12/1968 | Rosenbaum | A44B 19/32 2/2.17 |
| 3,468,576 | A | * | 9/1969 | Beyer | E05C 19/16 292/251.5 |

(Continued)

*Primary Examiner* — Robert Sandy
*Assistant Examiner* — Louis A Mercado
(74) *Attorney, Agent, or Firm* — Treyz Law Group, P.C.; G. Victor Treyz; Tianyi He

(57) ABSTRACT

An enclosure may be provided with a housing. The housing may have an opening that separates and joins along a seam. A magnetic closure may have a pair of mating flexible magnetic members such as flexible rings or strips that run along the seam. Magnetic-field shunts may be provided in the flexible magnetic members. Multiple magnetic elements may be formed along the length of each magnetic member to form a multipole permanent magnet. Magnetic attraction may be varied along the lengths of the magnetic members and may be varied as a function of the separation between opposing magnet members. A magnetic clasp may be provided on the housing. The magnetic clasp may have attracting magnets to help close the opening in the housing. Protruding clasp portions may be formed from flexible material and may have embedded magnets configured to repel each other to facilitate use of the clasp.

25 Claims, 13 Drawing Sheets

(56) References Cited

U.S. PATENT DOCUMENTS

| | | | |
|---|---|---|---|
| 4,033,013 A * | 7/1977 | Peterson | A45C 13/1069 |
| | | | 24/303 |
| 4,399,595 A | 8/1983 | Yoon et al. | |
| 4,451,321 A * | 5/1984 | McKelvey | B29C 43/3607 |
| | | | 156/382 |
| 4,941,236 A * | 7/1990 | Sherman | A44C 5/2071 |
| | | | 24/265 WS |
| 6,527,105 B2 * | 3/2003 | Tarnawskyj | B29C 65/56 |
| | | | 198/844.2 |
| 6,873,235 B2 * | 3/2005 | Fiske | F16C 32/0438 |
| | | | 335/306 |
| 7,320,158 B2 | 1/2008 | Deto et al. | |
| 8,484,809 B2 | 7/2013 | Fiedler | |
| 2007/0028429 A1 | 2/2007 | Ishida | |
| 2009/0071502 A1 | 3/2009 | Drugeon | |
| 2011/0279206 A1 | 11/2011 | Fullerton et al. | |
| 2017/0062109 A1 * | 3/2017 | Good | B65D 33/24 |

* cited by examiner

ENCLOSURES WITH FLEXIBLE MAGNETIC CLOSURES AND CLASPS

This application claims the benefit of provisional patent application No. 62/526,159, filed on Jun. 28, 2017, which is hereby incorporated by reference herein in its entirety.

FIELD

This relates generally to items with closures, and, more particularly, to magnetic closures.

BACKGROUND

Magnets may be used as closures in bags, as clasps in watch bands, and in other items where it is desirable to hold structures together. If care is not taken, magnetic structures may be overly rigid, may not provide desired performance during engagement and disengagement, may not be integrable into desired products, or may be bulky and weak.

SUMMARY

An enclosure such as a case for an electronic device such as a pair of headphones may be provided with a housing. The housing may have an opening into an interior region that receives the headphones. A magnetic closure may be formed along the opening. The magnetic closure may have a pair of mating flexible magnetic members such as flexible rings that can be separated to form the opening or joined along a seam to close the opening.

Each flexible magnetic member may be formed from magnetic particles or permanent magnet elements embedded in an elastomeric polymer. Elastomeric magnetic-field shunts may be provided in the flexible magnetic members. Multiple magnetic elements may be formed along the length of each magnetic member to form a multipole permanent magnet. Magnetic attraction force may be varied along the lengths of the magnetic members and may be varied as a function of the separation between opposing magnet members.

A magnetic clasp may be provided on the housing. The magnetic clasp may have attracting magnets to help close the opening in the housing. Protruding clasp portions may be formed from flexible polymer material and may have embedded magnets configured to repel each other to facilitate use of the clasp.

DETAILED DESCRIPTION

Magnets may be used in forming closures for enclosures and other items. For example, a pair of flexible magnets may form a magnetic closure that helps hold portions of a case together. The case may be used to house an electronic device such as a pair of headphones. The case may also be provided with a magnetic clasp. If desired, other types of items may be provided with magnetic closures and clasps such as watchbands, handbags, purses, etc. Illustrative configurations in which an item such as a headphone case is provided with a magnetic closure system and a magnetic clasp may sometimes be described herein as an example. This is, however, merely illustrative. Any suitable items may be provided with magnets that form closures, clasps, and other magnetic structures.

Figure 1:
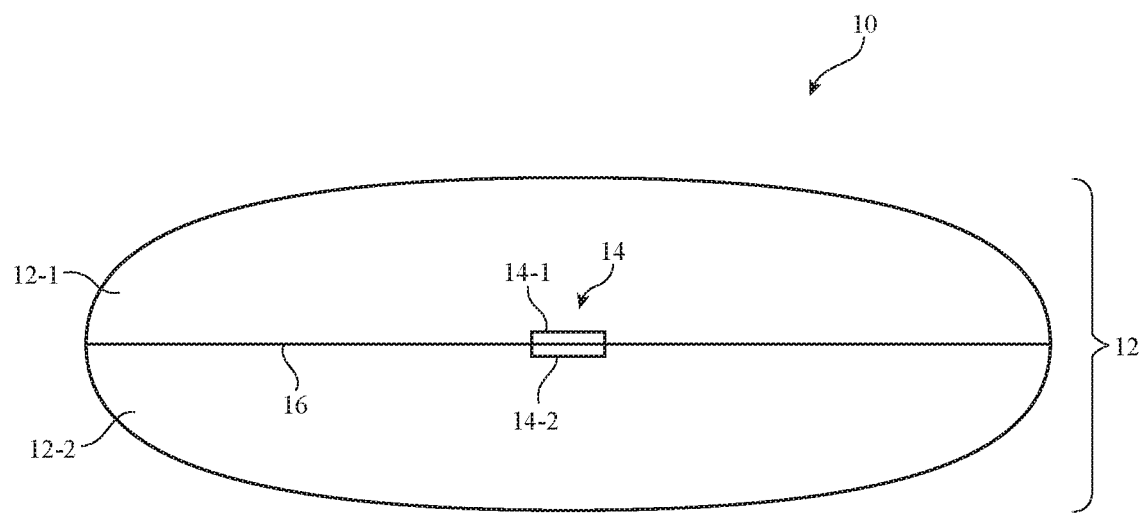
FIG. 1 is a top view of an illustrative item with a magnetic closure in accordance with an embodiment.

An illustrative item such as a case for holding headphones is shown in FIG. 1. As shown in the illustrative top view of FIG. 1, item 10 (e.g., a headphone case or other electronic device case) may include a multipart housing such as housing 12. Housing 12 may include mating first and second portions such as portions 12-1 and 12-2. Housing 12 may be formed from fabric, leather, plastic, metal, glass, ceramic, other materials, and/or combinations of these materials. Housing 12 may be flexible (e.g., soft and deformable) and/or may have rigid portions.

Housing portions 12-1 and 12-2 may have edges that meet along seam 16. Seam 16 may run along part or all of the periphery of device 10. A magnetic closure may run along some or all of the length of seam 16 to hold the opposing edges of housing portions 12-1 and 12-2 together and thereby secure an electronic device or other structures within the interior of case 10. For example, a magnetic closure may have a magnetic member that runs along an edge of housing portion 12-1 and a magnetic member that runs along a mating edge of housing portion 12-2. When it is desired to access the interior of housing 12, housing portions 12-1 and 12-2 may be separated along seam 16 to form an opening into the interior of housing 12.

Clasp 14 may have portions such as portions 14-1 and 14-2. Clasp 14 may have a mechanical latching structure such as a snap that allows clasp 14 to be engaged and disengaged and/or magnetic structures may be provided in claps 14 to facilitate clasp engagement and disengagement. The inclusion of clasp 14 in case 10 may help secure the contents of case 10. If desired, clasp 14 may be omitted and case 10 opened and closed exclusively using magnetic attraction from the magnetic closure running along seam 16.

Figure 2:
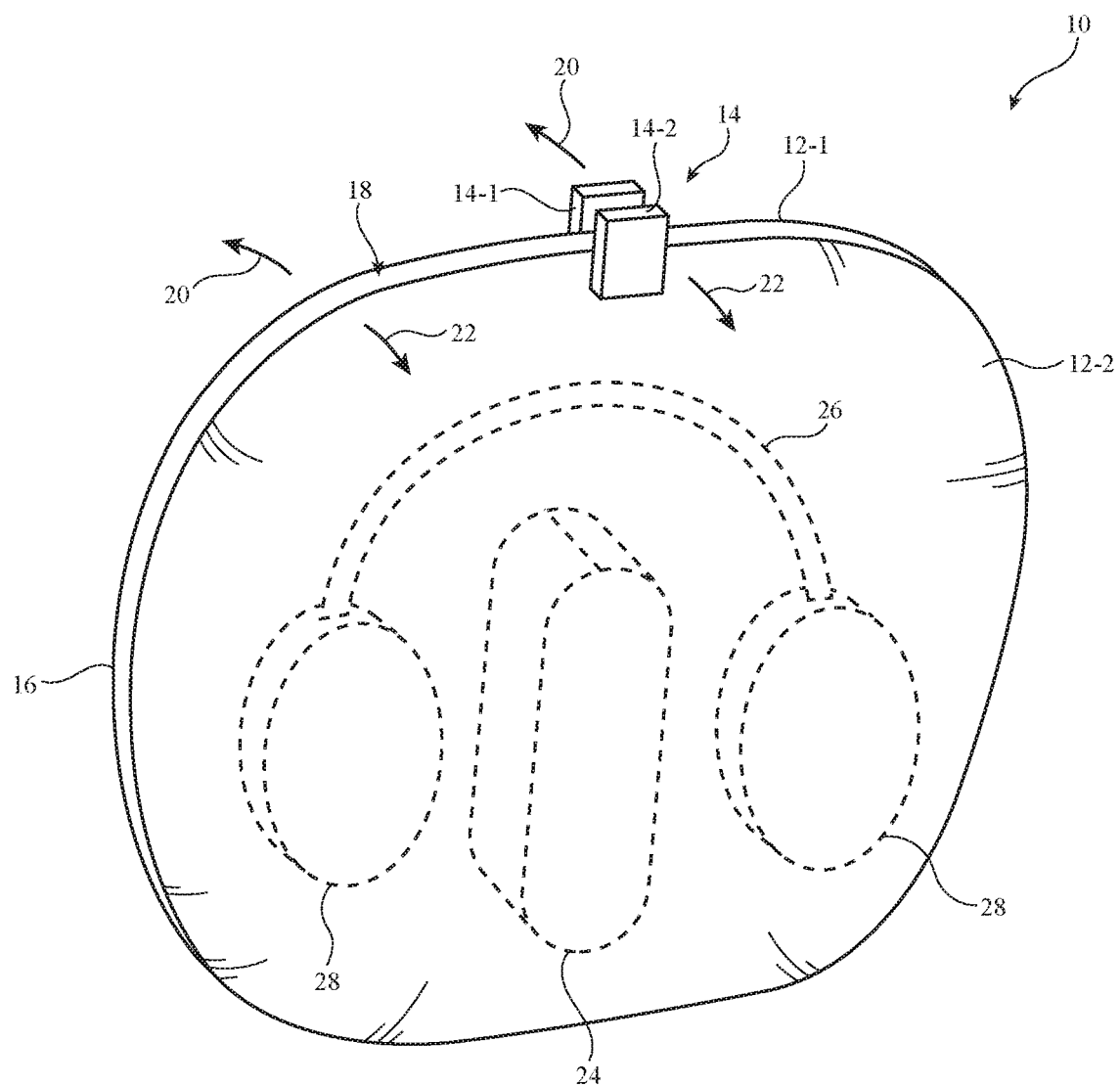
FIG. 2 is a perspective view of an illustrative item with a magnetic closure in accordance with an embodiment.

The illustrative perspective view of FIG. 2 shows how an electronic device such as a pair of headphones 26 may be enclosed within the interior of case 10. Headphones 26 may have ear cups 28 that rest on opposing sides of internal case separator 24. Separator 24 may have the shape of a tube and case 10 may have a central opening that is aligned with the tube or separator 24 may have other configurations (e.g., separator 24 may be tubular or solid and housing 12 may be solid without any central openings aligned with separator 24).

When headphones 26 have been stowed in the interior of case 10, the magnetic closure running along seam 16 may be closed, so that opening 18 between housing portions 12-1 and 12-2 is closed. When it is desired to access the interior of case 10, a user may pull clasp portion 14-1 and housing portion 12-1 in direction 20 while pulling clasp portion 14-2 and housing portion 12-2 in direction 22. This causes magnetic members formed from magnets in the magnetic closure along seam 16 to separate at clasp 14 and, after additional pulling by the user, causes the magnetic members of the magnetic closure to separate along some or all of the rest of the length of seam 16.

As portions 12-1 and 12-2 separate from each other, opening 18 is formed between housing portions 12-1 and 12-2 in housing 12 of case 10, allowing a user to access the interior of housing 12 and case 10. If desired, the interior of housing 12 need not be fully enclosed by housing 12. Configurations in which housing 12 fully encloses an interior region in housing 12 may be described herein as an example.

Figure 3:
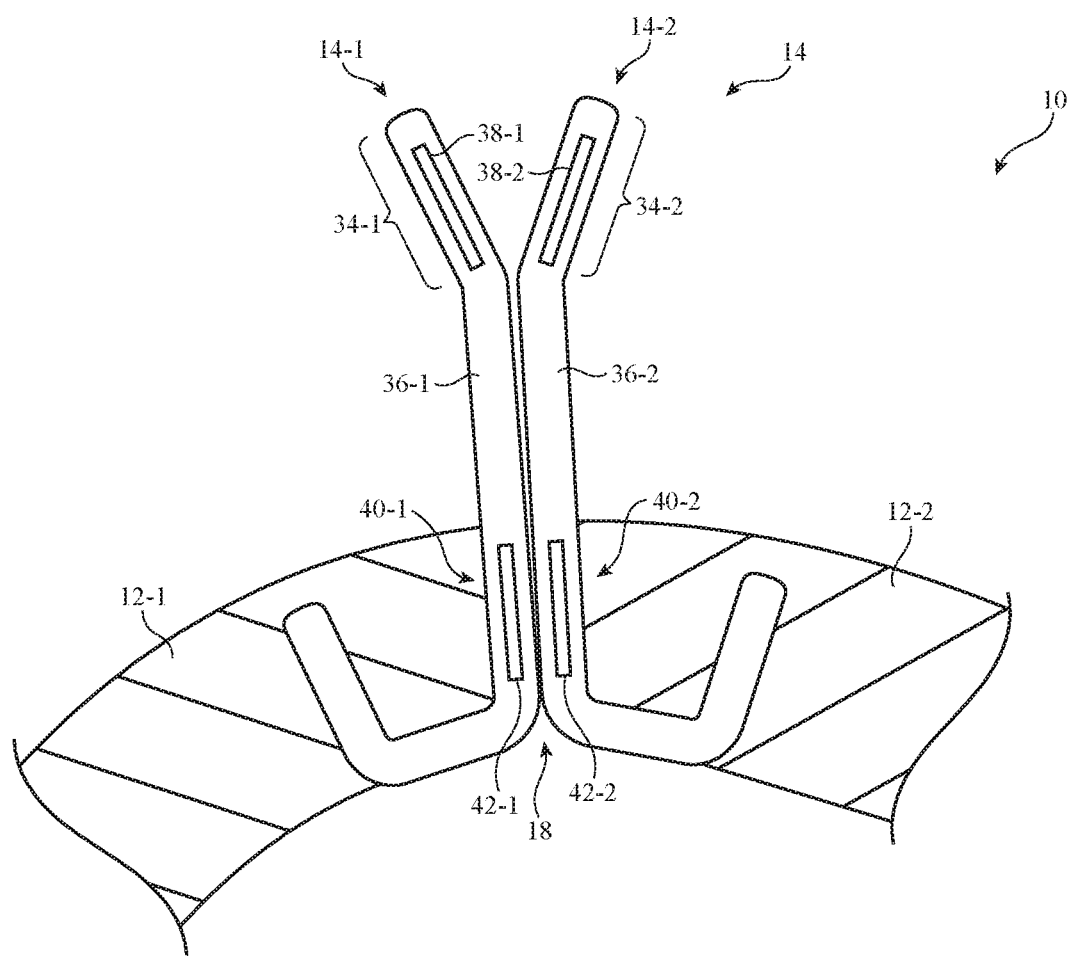
FIG. 3 is a cross-sectional side view of an illustrative magnetic clasp in accordance with an embodiment.

To facilitate use of clasp 14, portions 14-1 and 14-2 of clasp 14 (sometimes referred to as clasp tabs, protruding clasp portions, or clasp members) may be formed from flexible polymer or other flexible structures that are biased away from each other as shown in FIG. 3. As illustrated by the example of FIG. 3, clasp portion 14-1 may include a lower portion such as lower portion 40-1 that is mounted to housing portion 12-1 and clasp portion 14-2 may include a lower portion such as lower portion 40-2 that is mounted to housing portion 12-2. A first magnet such as magnet 42-1 may be provided in portion 40-1 (e.g., by molding plastic or other material for portion 14-1 around magnet 42-1). A corresponding second magnet such as magnet 42-2 may likewise be provided in portion 40-2 and may be oriented to attract magnet 40-1. This configuration helps hold clasp 14 together and thereby close item 10 along seam 16.

Portions 14-1 and 14-2 may also include respective upper portions 34-1 and 34-2 and respective middle portions 36-1 and 36-2 that couple upper portions 34-1 and 34-2 respectively to lower portions 40-1 and 40-2. A pair of repelling magnets such as magnet 38-1 in portion 34-1 and magnet 38-2 in portion 34-2 may be used to bias upper portions 34-1 and 34-2 away from each other, thereby enhancing the ability of a user's fingers to be inserted into the gap between portions 34-1 and 34-2 and to grasp portions 34-1 and 34-2. By making protruding portions of clasp 14 easier to grasp, the inclusion of repelling magnets into clasp 14 may make clasp 14 easier to use.

If desired, portions 14-1 and 14-2 may be formed from rigid materials (e.g., rigid plastic or metal). In this type of arrangement, magnets 38-1 and 38-2 may be omitted and a user may open clasp 14 by pressing portions 34-1 and 34-2 together and thereby levering portions 40-1 and 40-2 away from each other.

Figure 4:
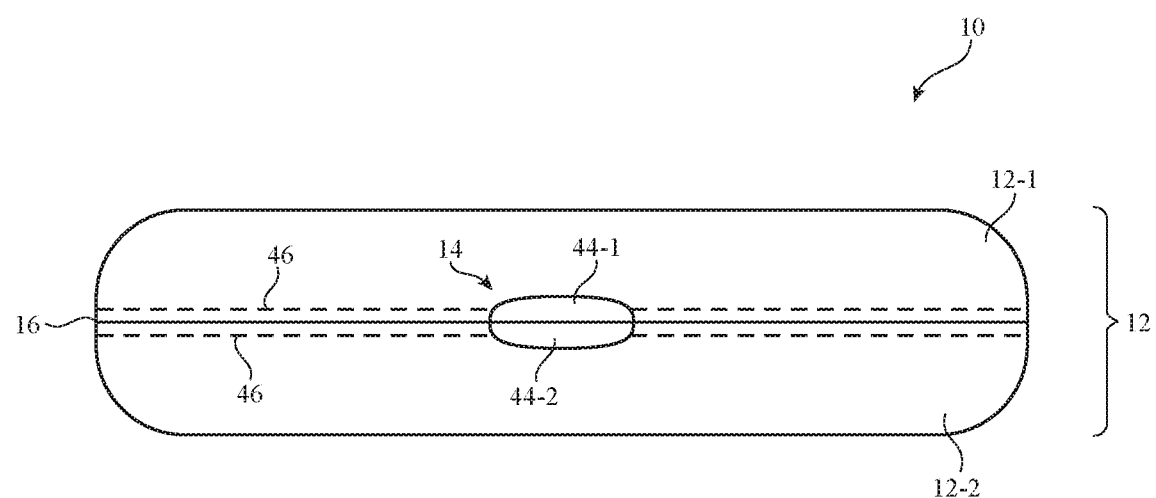
FIG. 4 is a top view of an illustrative item with a magnetic closure and recessed portions to receive the fingertips of a user in accordance with an embodiment.

The magnetic closure of item 10 may be formed from a pair of mating magnetic members such as magnetic members 46 of FIG. 4. Magnetic members 46 may each include one or more magnets. The magnets of members 46 and other magnetic structures of item 10 (e.g., the magnets of clasp 14) may be formed from rare-earth permanent magnets (e.g., individual permanent magnetic elements formed from rare-earth magnetic material) and/or from magnetic materials such as rare-earth magnetic particles (e.g., magnetic particles embedded in polymer). Magnetic structures may also be formed using magnetic-field shunts of iron, ferrite, and other magnetic materials.

As shown in FIG. 4, magnetic members 46 may run along seam 16. For example, one member 46 may run along an edge of housing portion 12-1 adjacent to seam 16 (and adjacent to opening 18 of FIG. 2) and another member 46 may run along an edge of housing portion 12-2 adjacent to seam 16 (and adjacent to opening 18 of FIG. 2). Members 46 are configured to join along seam 16 to close opening 18 and are configured to separate along seam 16 to open housing 12 and form opening 18.

Members 46 may be formed from polymer into which magnetic particles have been embedded to form magnets (e.g., magnetic elements, sometimes referred to as magnetic poles). Each magnetic member may, for example, be formed from an elastomeric polymer such as silicone into which magnetic particles have been embedded. In this type of arrangement, members 46 may be flexible magnetic members (flexible magnets) that can be flexed while opening and closing item 10.

Flexible magnetic members 46 may form a magnetic closure for items such as item 10 of FIGS. 1, 2, and 3 or, if desired, clasp 14 may be omitted from item 10 (e.g., in an arrangement in which housing portion 12-1 is provided with finger recess 44-1 and in which housing portion 12-2 is provided with finger recess 44-2 as shown in FIG. 4 to facilitate opening of clasp 14 by the fingers of a user). If desired, housing portions 12-1 and 12-2 may be separated by pinching housing 12 between the fingers of a user. As the user squeezes housing 12, the walls of housing 12 may spread apart and form opening 18.

Figure 5:
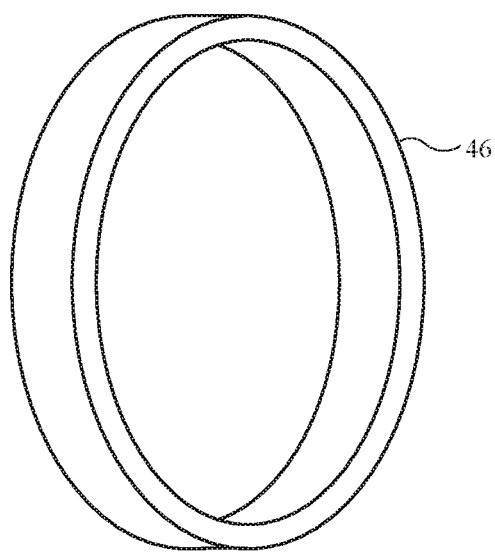
FIG. 5 is a perspective view of an illustrative flexible magnetic ring member for use in a magnetic closure in accordance with an embodiment.

An illustrative configuration for magnetic member 46 is shown in FIG. 5. In the example of FIG. 5, magnetic member 46 has a ring shape. Magnetic member 46 may be, for example, a flexible elastomeric magnetic ring. The cross-sectional profile of magnetic member 46 may be rectangular, oval, circular, U-shaped, or may have other suitable cross-sectional shapes. If desired, magnetic member 46 may be a partial ring (e.g., a curved flexible magnetic strip) or other suitable magnetic structure. The example of FIG. 5 is merely illustrative.

Figure 6:
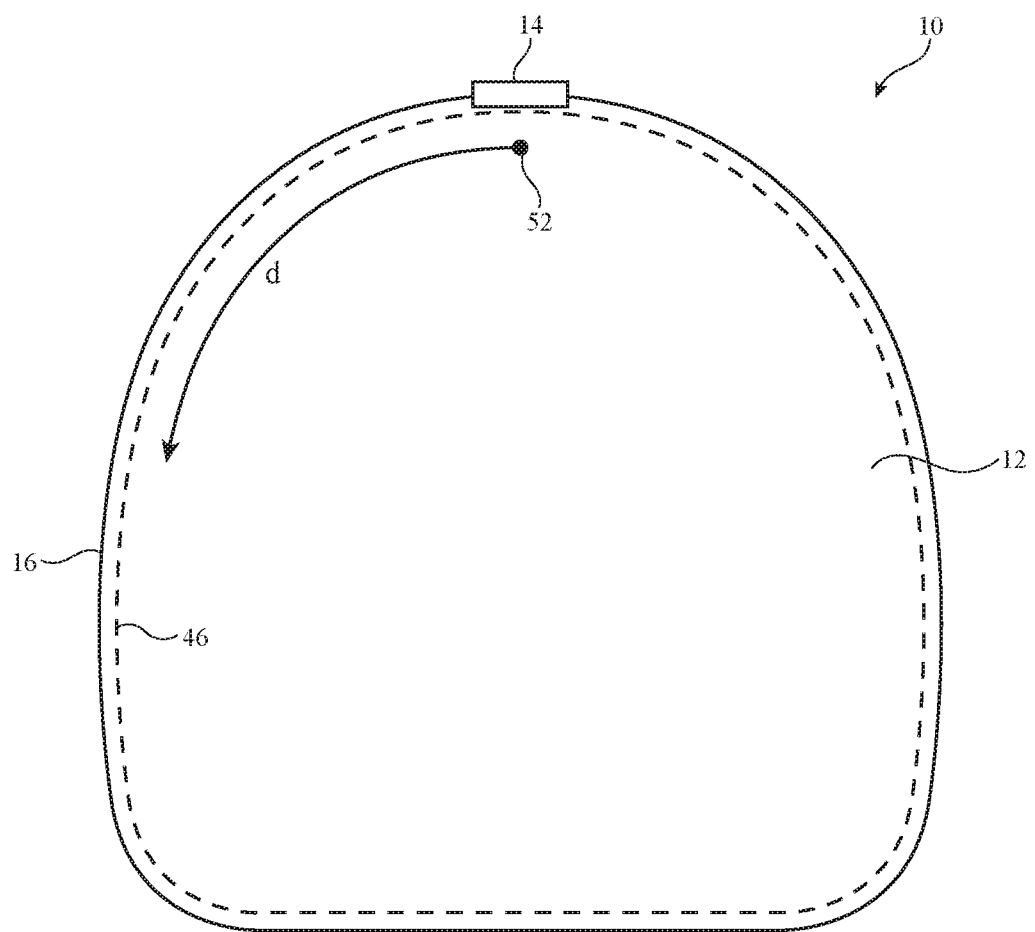
FIG. 6 is a side view of an illustrative item with a magnetic closure in accordance with an embodiment.
Figure 7:
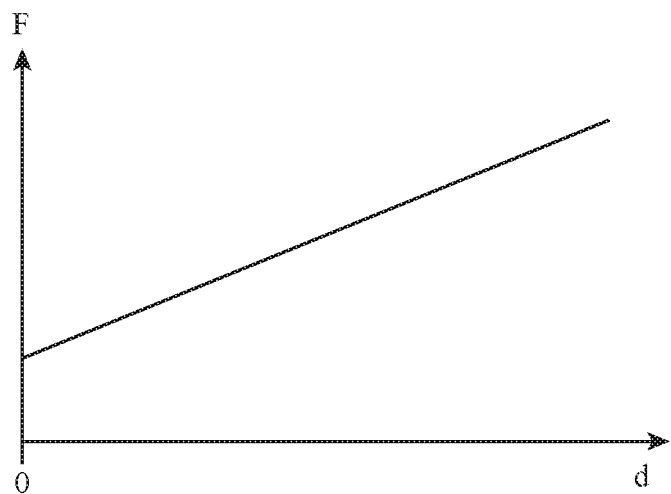
FIG. 7 is a graph in which magnetic force for an illustrative closure has been plotted as a function of distance along the closure away from a clasp in accordance with an embodiment.

To facilitate smooth opening of housing 12 of item 10, the magnetic strength of the magnetic closure (e.g., the magnetic attractive force between opposing members 46 on opposing sides of seam 16) may be varied as a function of distance d along the periphery of item 10. For example, the closing force of the magnetic closure formed from the pair of opposing magnetic members 46 in item 10 may have a minimum value at position 52 of FIG. 6 (e.g., at clasp 14, where distance d from position 52 is zero) and may progressively increase at increasing distances d along seam 16 away from position 52. A graph of this type of graded magnetic closure closing force F as a function of distance along seam d is shown in FIG. 7. If desired, other closing force profiles may be used in the magnetic closure for item 10 (e.g., profiles that decrease as a function of increasing distance d, profiles that have both decreasing and increasing portions as functions of increasing distance d, etc.). When force F increases progressively at increasing distances d, excessively rapid opening of item 10 is avoided (e.g., to help prevent a user from spilling the contents of item 10 by opening item 10 too abruptly).

Figure 8:
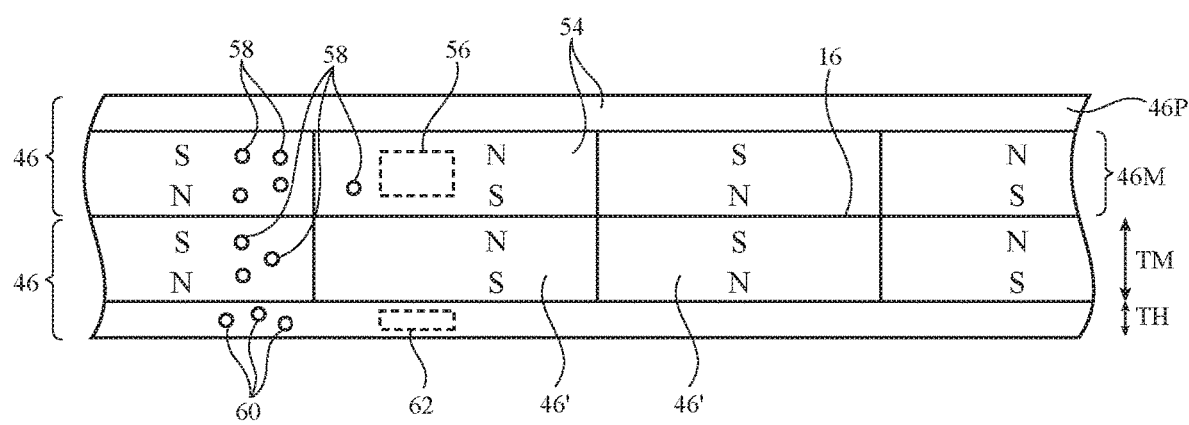
FIG. 8 is a cross-sectional side view of a pair of mating flexible magnetic members for a magnetic closure in accordance with an embodiment.

FIG. 8 is a cross-sectional side view of a pair of mating magnetic members 46. Each member 46 may be formed from a flexible polymer or other binder material (material 54). Material 54 may be, for example, a flexible polymer such as silicone or other elastomeric polymer. Each magnetic member 46 may have multiple magnetic elements (sometimes referred to as poles) such as elements 46' and may therefore sometimes be referred to as a multipole magnet or multiple magnetic member. Magnetic elements 46' may have any suitable polarity pattern. For example, the polarities of magnetic elements 46' may alternate along the length of magnetic member 46 (e.g., elements 46' may have exposed poles that alternate between north and south along the length of magnetic member 46, etc.).

Magnetic elements 46' may be formed from embedded magnets (e.g., permanent magnetics such as rare-earth magnets) such as embedded magnet 56 and/or from magnetized magnetic particles such magnetic particles 58. Magnetic particles 58 may be formed from rare-earth magnetic materials and/or other magnetic materials. Particles 58 may be magnetically anisotropic and may be aligned by applying an orienting magnetic field during compression molding operations to form member 46. A matrix of electromagnets may then be used to magnetize particles 58 to form a desired corresponding pattern of poles.

Magnetic elements 46' may be arranged along the length (elongated axis) of magnetic element portion 46M of member 46. The magnetic elements 46' in a first of members 46 may be configured to attract the corresponding adjacent magnetic members 46' in a second of members 46 (e.g., the north pole of a magnetic element 46' in a first of members 46 may be aligned with the adjacent south pole of a corresponding magnetic element 46' in a second of members 46, etc.).

Optional magnetic-field shunts such as magnetic-field shunt layers 46P may be formed in each member 46 (e.g., on the side of member 46 facing away from seam 16). This helps concentrate magnetic fields towards seam 16. Shunt layer 46P may be formed from elastomeric material (e.g., material 54) and may include embedded magnetic particles 60 (e.g., ferrite particles, iron particles, or other magnetic particles) and/or may contain embedded pieces of magnetic material (e.g., iron bars and/or other magnetic structures such as magnetic shunt structure 62).

The thickness TM of magnetic layer 46M in each member 46 may be at least 1 mm, at least 2 mm, at least 4 mm, less than 5 mm, less than 3.5 mm, 1-3.5 mm, or other suitable thickness. The thickness TH of magnetic-field shunt layer 46P in each member 46 may be 0.2-1.5 mm, at least 0.3 mm, at least 0.7 mm, less than 3 mm, less than 1.5 mm, or other suitable thickness. Layers 46M and 46P may be integral elastomeric portions of a single elastomeric member and/or may be separate elastomeric structures that are attached using adhesive or other attachment mechanisms. The length of each magnetic element 46' in each member 46 may be 5-15 mm, at least 3 mm, at least 7 mm, less than 20 mm, or other suitable length.

Figure 9:
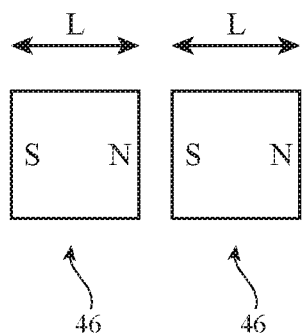
FIG. 9 is a cross-sectional side view of an illustrative pair of magnets for a closure in accordance with an embodiment.

To adjust the attractive force of magnetic members 46 as a function of distance d along members 46, members 46 may have properties such as size, shape, magnetic particle concentration, etc. that vary along their lengths. As shown in the cross-sectional view of members 46 in FIG. 9, for example, each member 46 may have a lateral size L. To vary the strength of the attractive force F between members 46, the size of L (and, if desired, other cross-sectional dimensions of member 46) may be varied as a function of distance d.

Figure 10:
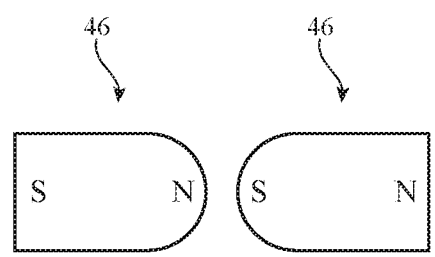
FIG. 10 is a cross-sectional side view of a pair of magnets with cross-sectional profiles that are curved along the surfaces where the magnets mate in a closure in accordance with an embodiment.

As another example, the shape of the cross-sectional profile of members 46 may be varied as a function of distance d. As shown in FIG. 10, for example, members 46 may have curved surfaces that face each other. With this type of arrangement, the attractive force F between members 46 can be progressively increased with increasing distance d by flattening the curvature of members 46 as a function of increasing distance d.

Figure 11:
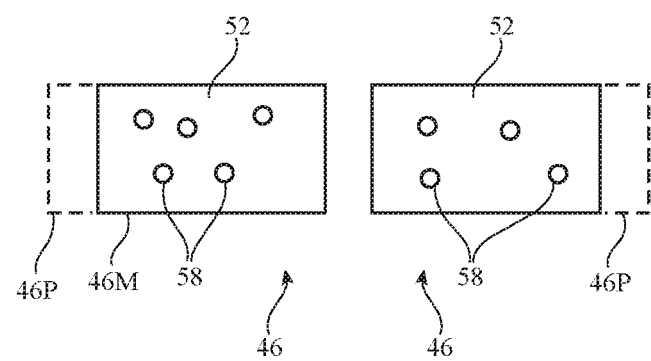
FIG. 11 is a cross-sectional side view of a pair of molded polymer magnets for a magnetic closure in accordance with an embodiment.

FIG. 11 shows how members 46 may include magnetic particles 58 (e.g., permanently magnetized rare-earth magnetic particles) in magnetic layers 46M. To increase force F as a function of increasing distance D, the concentration of magnetic particles 58 in polymer binder 52 may be progressively increased as a function of increasing distance d and/or the properties (size, strength, position, etc.) of optional magnetic-field shunt layers 46P may be progressively varied as a function of distance d.

Figure 12:
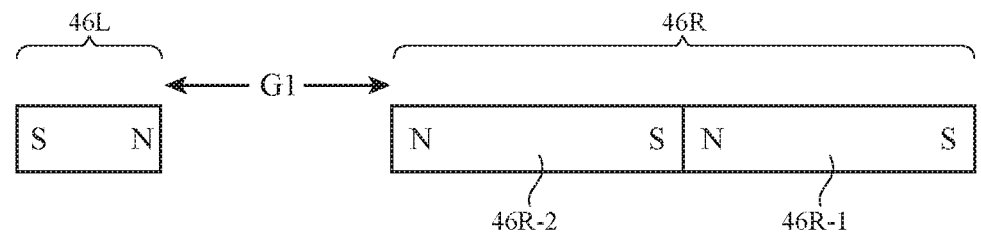
FIGS. 12 and 13 are side views of illustrative magnetic structures such as flexible magnetic members for a magnetic closure having a closing force that varies as a function of magnet separation in accordance with an embodiment.
Figure 13:
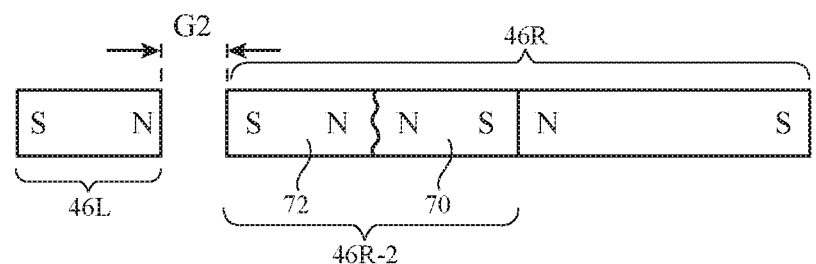

In the examples of FIGS. 12 and 13, magnetic structures have been provided in members 46 that provide the magnetic closure with a closing force that varies as a function of the size of gap G across opening 18 (e.g., the separation between the adjacent surfaces of opposing members 46). As shown in FIG. 12, for example, left-hand magnetic member 46L may be formed from a magnet having a north pole facing to the right. Right-hand magnetic member 46R may have two parts. First part 46R-1 may be a permanent magnet with a north pole facing to the left (in opposition to the north pole of member 46L). Second part 46R-2 may be an unmagnetized magnetic structure (e.g., a structure formed from magnetic material such as ferrite, iron, etc.). Structures such as parts 46R-1 and 46-R2 may be formed from magnetic particles embedded in elastomeric polymer and/or larger pieces of magnetic material embedded in elastomeric polymer.

When gap G is relatively large as shown by gap G1 in FIG. 12, the permanent magnet of part 46R-1 will have a greater influence on the magnetic state of part 46R-2 than magnet 46L. As a result, part 46R-1 will coerce magnetic structure 46R-2 so that structure 46R-2 develops a north pole facing to the left in opposition to the right-facing north pole of member 46L. In this type of arrangement (e.g., when the gap G has a relatively large value of G1), magnetic members 46L and 46R will repel each other.

When the magnitude of gap G is smaller (e.g., gap G2 of FIG. 13), left-hand magnetic member 46L will be sufficiently strong to coerce portion 72 of part 46R-2, while part 46R-1 coerces part 70. Parts 72 and 70 will have opposing poles in this type of configuration, but because these opposing poles are confined adjacent to each other in a single structure (part 46R-2), the amount of repulsive force between member 46L and member 46R decreases. Magnetic member 46L may therefore be attracted by portion 72 (e.g., the attractive force F between elements 46L and 46R may be positive).

Figure 14:
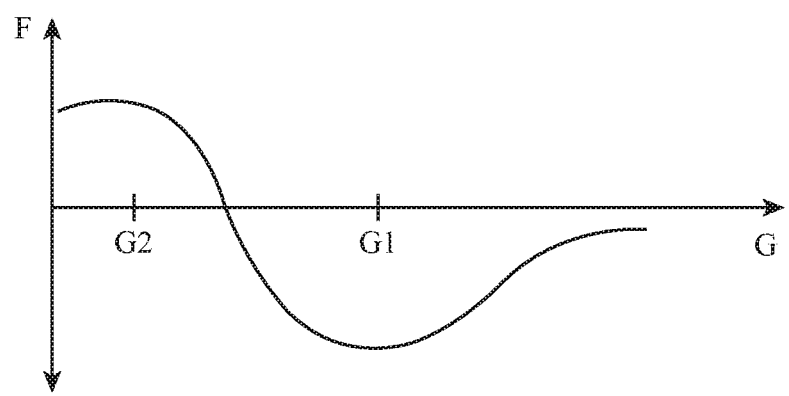
FIG. 14 is a graph showing magnetic force as a function of distance for an illustrative magnetic closure of the type shown in FIGS. 12 and 13 in accordance with an embodiment.

As this example demonstrates, the magnetic closure formed by members 46 may be configured so that members 46 are initially difficult to separate and become easier to separate (and may even spontaneously separate due to magnetic repulsion) once a threshold separation distance has been exceeded. As shown in the graph of FIG. 14, there is initially an attractive force F (F is positive) between members 46L and 46R (e.g., when gap G is equal to G2). Following further separation of members 46L and 46R so that gap G is equal to G1, members 46L and 46R repel each other (force F is negative) as shown in FIG. 12.

Figure 15:
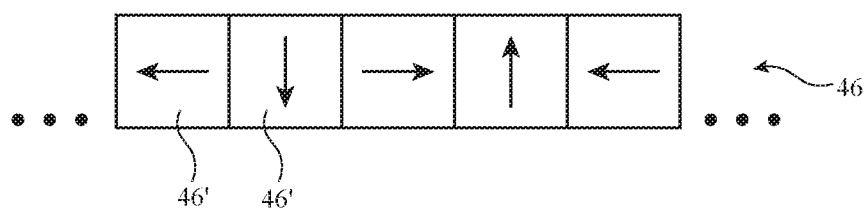
FIG. 15 is a side view of an illustrative Halbach magnet array that may be used in a magnetic closure in accordance with an embodiment.

If desired, magnetic forces can be concentrated in the direction facing seam 16 by arranging the magnetic elements 46' in each member 46 using a Halbach array pattern (see, e.g., FIG. 15). Patterning the poles of member 46 using the Halbach pattern helps concentrate magnetic fields on one side of member 46 (e.g., the top of member 46 in the example of FIG. 15) while decreasing magnetic fields on the opposing side of member 46 (e.g., the bottom of member 46 in the example of FIG. 15).

Figure 16:
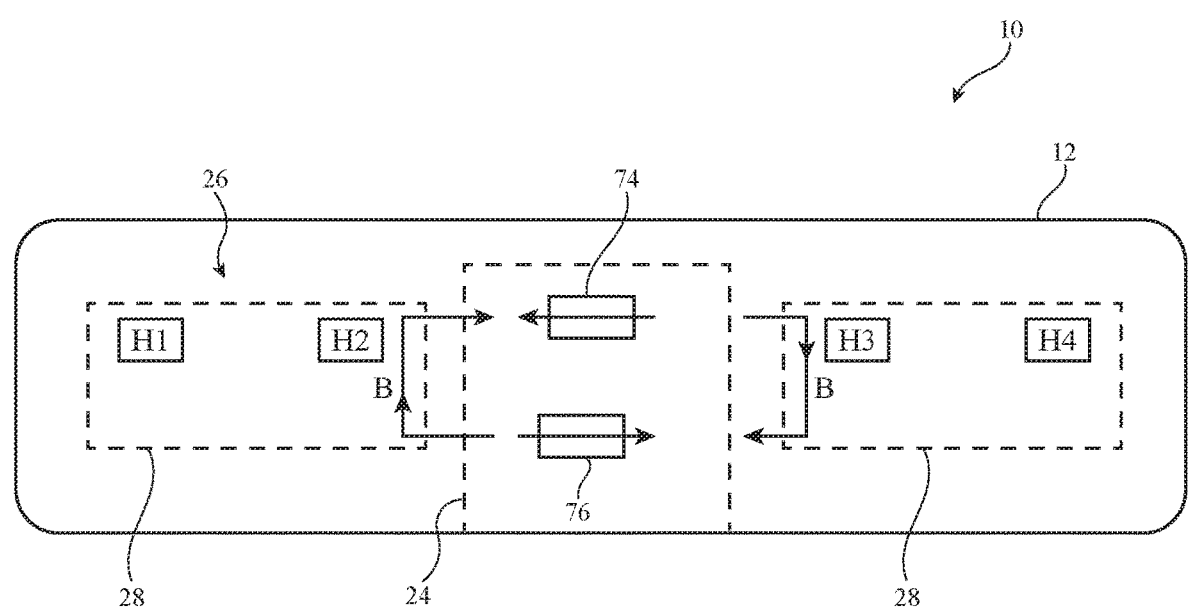
FIG. 16 is a cross-sectional top view of an illustrative item with magnetic sensors configured to interact with magnetic sensors on an electronic device within the item in accordance with an embodiment.

The cross-sectional top view of item 10 of FIG. 16 shows how ear cups 28 may each be provided with a pair of magnetic sensors (e.g., Hall Effect sensors). For example, one of ear cups 28 may be provided with magnetic sensors H1 and H2 and the other of cups 28 may be provided with magnetic sensors H3 and H4. Separator 24 or other structures in item 10 may be provided with permanent magnets such as magnets 74 and 76. Magnets 74 and 76 establish a magnetic field B in the interior of housing 12 of item 10 that can be detected by the magnetic sensors of headphones 26. Because each ear cup 28 has a pair of magnetic sensors in the illustrative configuration of FIG. 16, at least one of the magnetic sensors on each ear cup will intersect the magnetic field B produced by magnets 74 and 76, even if one or both ear cups 28 are reversed in their orientation when being stowed in item 10.

Headphones 26 may monitor the magnetic sensors for magnetic field B. When magnetic field B is not present, control circuitry in headphones 26 can conclude that headphones 26 have not been stowed in item 10 and can operate normally. When magnetic field B is detected, control circuitry in headphones 26 can power down headphones 26 to conserve power.

Figure 17:
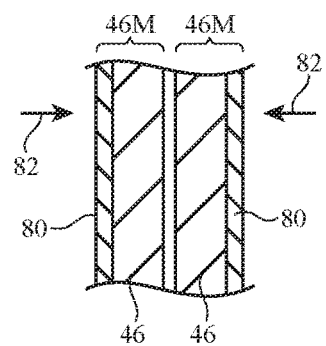
FIG. 17 is a cross-sectional side view of flexible magnets with stiffener members for a closure in accordance with an embodiment.

If desired, the magnetic closure for item 10 may include stiffeners. As shown in FIG. 17, for example, stiffeners 80 may be coupled to magnetic members 46 to form a pair of mating stiffened magnetic closure structures 46M. Due to magnetic attraction between flexible magnetic structures 46M, Structures 46M are drawn towards each other in directions 82, closing the closure of item 10.

Stiffeners 80 may be formed from metal, polymer, polymer with embedded fibers (e.g., fiberglass, carbon fiber composite material), polymer with other embedded structures, other materials, or combinations of these materials. As an example, stiffeners 80 may be formed from spring steel. Stiffeners 80 may be sufficiently flexible to be bent into a hoop shape while being sufficiently stiff to help hold housing portions 12-1 and 12-2 in a desired shape (e.g., when housing portions 12-1 and 12-2 are formed from soft and flexible materials such as fabric). The stiffness of stiffeners 80 also helps hold housing portions 12-1 and 12-2 in place when the closure is opened (e.g., so that items may be stored in housing 12).

In arrangements in which stiffeners 80 are formed from magnetic material such as steel, stiffeners 80 may serve as magnetic shunts for magnetic members 46 in addition to serving as mechanical stiffening structures.

Figure 18:
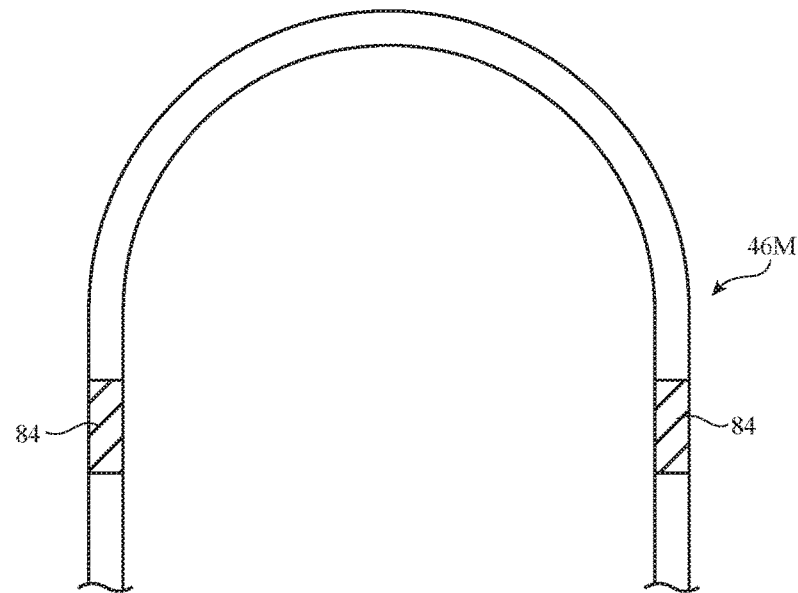
FIG. 18 is a diagram of an illustrative hoop-shaped closure formed from flexible magnets with stiffeners in accordance with an embodiment.

Magnetic attraction between magnetic members 46 tends to close the closure formed from structures 46M. If desired, item 10 may be provided with springs that help temporarily hold structures 46M apart from each other when a user opens the closure by more than a given amount. In this way, a user will be able to removed items from the interior of housing 12 and place items into the interior of housing 12 through the opening formed by the open closure while the springs hold the closure in its temporarily opened position. As shown in FIG. 18, springs 84 may be formed near the base of structures 46M (e.g., where housing portions 12-1 and 12-2 split apart to form the opening in housing 12).

Figure 19:
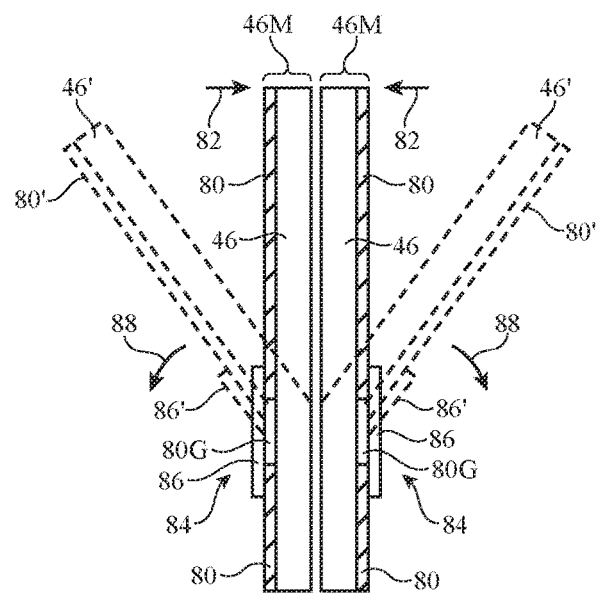
FIG. 19 is a side view of an illustrative closure having springs in accordance with an embodiment.

The operation of springs 84 is illustrated in FIG. 19. In the example of FIG. 19, stiffeners 80 have gaps such as gaps 80G (e.g., stiffeners 80 each have two parts separated by a respective one of gaps 80G). Elastomeric members 86 bridge gaps 80G. Members 86 may be attached to stiffeners 80 using adhesive or other suitable attachment mechanisms. Elastomeric members 86 may be formed from elongated strips of elastomeric polymer or other springy substance (sometimes referred to as a tensioned member, spring member, spring, etc.). Members 86 may be tensioned, so that members 86 form springs 84 that end to push structures 46M away from each other in directions 88. If desired, springs 84 may be formed from elastomeric material that is molded over gap 80G (e.g., elastomeric material that is molded over polymer structures forming stiffeners 80), may be formed from spring steel (e.g., separate spring steel members, spring steel portions of stiffeners 80 that are configured to push structures 46M away from each other, etc.) or may be formed from other suitable spring structures. The use of tensioned elastomeric strips of material to form springs 84 is illustrative.

When the closure of item 10 is in its closed position, members 46 are adjacent to each other and the force of the magnetic attraction between members 46 in direction 82 is high and exceeds the spring force from springs 84 that is imparted on members 46 in directions 88 by stiffeners 80. As a result, the closure of item 10 tends to remain in its closed position.

When a user forcefully opens the closure (e.g., using a clasp), the opening force imparted by the user in directions 88 overcomes the magnetic attraction between members 46 in directions 82, so that flexible magnetic members 46 are forced apart. The resulting separation between members 46 reduces the magnetic attraction between members 46. When the closure is in its open state, the spring forces imparted by springs 84 therefore overcome any magnetic attraction remaining between members 46 and hold magnetic members 46 away from each other. FIG. 19 shows, in the open state, members 46 are moved to open positions 46' and stiffeners 80 are moved to opening positions 80'. Spring members 86 bend into positions 86'. When the user desires to close the closure of item 10, the user may press structures 46M back together in directions 82, thereby overcoming the opening force created by springs 84.

The foregoing is merely illustrative and various modifications can be made to the described embodiments. The foregoing embodiments may be implemented individually or in any combination.

What is claimed is:

1. An item, comprising:
   a housing having first and second housing portions with respective first and second edges; and
   first and second flexible magnetic members that run respectively along the first and second edges, wherein the first and second flexible magnetic members are configured to separate to form an opening into an interior of the housing and are configured to join along a seam to close the opening, the first flexible magnetic member having a first magnetic-field shunt layer, the second flexible magnetic member having a second magnetic-field shunt layer, and the first and second magnetic-field shunt layers extending along the seam on opposing sides of the seam.

2. The item defined in claim 1 wherein the first and second flexible magnetic members comprise respective first and second multipole magnets containing magnetized magnetic particles embedded in elastomeric material.

3. The item defined in claim 1 further comprising a magnetic clasp having a first clasp portion coupled to the first housing portion and a second clasp portion coupled to the second housing portion.

4. The item defined in claim 3 wherein the magnetic clasp has a first magnet in the first clasp portion and a second magnet in the second clasp portion and wherein the first and second magnets are configured to attract each other.

5. The item defined in claim 4 wherein the first and second flexible magnetic members comprise elastomeric polymer with embedded magnetic particles.

6. The item defined in claim 5 wherein the magnetic clasp has a third magnet in the first clasp portion and a fourth magnet in the second clasp portion and wherein the third and fourth magnets are configured to repel each other.

7. The item defined in claim 1 further comprising a magnetic clasp having:
   a first protruding flexible polymer member coupled to the first housing portion;
   a second protruding flexible polymer member coupled to the second housing portion;
   a first permanent magnet in the first protruding flexible polymer member; and
   a second permanent magnet in the second protruding flexible polymer member that is configured to repel the first permanent magnet.

8. The item defined in claim 1 wherein the first flexible magnetic member comprises an elastomeric ring with embedded magnetic particles.

9. The item defined in claim 8 wherein the second flexible magnetic member comprises an elastomeric ring with embedded magnetic particles, wherein the first flexible magnetic member has a first magnetic element, and wherein the second flexible magnetic member has a second magnetic element that attracts the first magnetic element.

10. The item defined in claim 9 wherein the first and second flexible magnetic members are configured to exhibit different magnetic attraction forces at different positions along lengths of the first and second flexible magnetic members.

11. The item defined in claim 1 wherein the first and second flexible magnetic members are configured to increase magnetic attraction between the first and second flexible magnetic members as a function of increasing distance along the first and second flexible magnetic members from a location on the housing.

12. The item defined in claim 11 further comprising a clasp at the location.

13. The item defined in claim 1 wherein the first flexible magnetic member comprises a first series of magnetic elements with polarities that alternate along the first flexible magnetic member and wherein the second flexible magnetic member comprises a second series of magnetic elements with polarities that alternate along the second flexible magnetic member.

14. The item defined in claim 1 further comprising a first stiffener coupled to the first flexible magnetic member and a second stiffener coupled to the second flexible magnetic member.

15. The item defined in claim 1 further comprising a spring configured to help force the first and second flexible magnetic members away from each other.

16. The item defined in claim 1 further comprising a first stiffener coupled to the first flexible magnetic member and a second stiffener coupled to the second flexible magnetic member, wherein the first stiffener has a first gap, wherein the second stiffener has a second gap, and wherein the item further comprises:
   a first elastomeric strip that bridges the first gap and forms a first spring;
   a second elastomeric strip that bridges the second gap and forms a second spring.

17. The item defined in claim 1 wherein the first magnetic-field shunt layer comprises a first stainless steel member on the first flexible magnetic member, the second magnetic-field shunt layer comprises a second stainless steel member on the second flexible magnetic member, and the first and second stainless steel members serve as stiffeners for the first and second flexible magnetic members.

18. An enclosure configured to receive an electronic device, comprising:
   a housing having first and second housing portions with respective first and second edges; and
   first and second magnetic structures that run respectively along the first and second edges, wherein the first and second magnetic structures are configured to separate to form an opening into an interior of the housing and are configured to join along a seam to close the opening, and the first magnetic structure has a property that varies along a length of the first magnetic structure and is configured, based at least in part on the varied property, to magnetically attract the second magnetic structure with a force that increases at increasing distances from a position along the seam.

19. The enclosure defined in claim 18 wherein the first and second magnetic structures each comprise elastomeric material with embedded magnetic particles.

20. The enclosure defined in claim 18 wherein the first and second magnetic structures respectively include first and second magnetic-field shunt layers, and the first and second magnetic-field shunt layers comprise elastomeric material with embedded magnetic particles.

21. The enclosure defined in claim 18 wherein the varied property of the first magnetic structure is a size, a shape, or a magnetic particle concentration.

22. The enclosure defined in claim 18 wherein the first magnetic structure comprises a first flexible magnetic structure and the second magnetic structure comprises a second flexible magnetic structure, the enclosure further comprising:
   a first stiffener coupled to the first flexible magnetic structure; and
   a second stiffener coupled to the second flexible magnetic structure.

23. A case, comprising;
a housing having an opening; and
first and second magnetic structures on opposing sides of the opening, wherein the first and second magnetic structures are configured to exhibit a magnetic attraction that attracts the first and second magnetic structures to each other when the first and second magnetic structures are separated by a first distance and that repels the first and second magnetic structures from each other when the first and second magnetic structures are separated by a second distance that is greater than the first distance.

24. The case defined in claim 23 wherein the housing is configured to receive headphones and wherein the first magnetic structure comprises a flexible magnetic ring member with magnetic particles embedded in polymer.

25. The case defined in claim 24 further comprising a flexible magnetic-field shunt layer in the flexible magnetic ring member.

* * * * *